(12) United States Patent
Itoh et al.

(10) Patent No.: US 8,456,070 B2
(45) Date of Patent: Jun. 4, 2013

(54) OPTICAL LAYERED BODY, POLARIZER AND IMAGE DISPLAY DEVICE

(75) Inventors: Kiyoshi Itoh, Tokyo (JP); Yoko Kinoshita, Tokyo (JP); Kiyotaka Matsui, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 792 days.

(21) Appl. No.: 12/521,243

(22) PCT Filed: Dec. 27, 2007

(86) PCT No.: PCT/JP2007/075135
§ 371 (c)(1),
(2), (4) Date: Sep. 9, 2009

(87) PCT Pub. No.: WO2008/081874
PCT Pub. Date: Jul. 10, 2008

(65) Prior Publication Data
US 2010/0096970 A1    Apr. 22, 2010

(30) Foreign Application Priority Data

Dec. 28, 2006 (JP) .................. 2006-355469

(51) Int. Cl.
*H01J 5/16* (2006.01)

(52) U.S. Cl.
USPC ........................................ 313/112; 313/110

(58) Field of Classification Search
USPC .................................. 313/110–112
See application file for complete search history.

(56) References Cited

U.S. PATENT DOCUMENTS

2006/0092495 A1 * 5/2006 Muramatsu .................. 359/275

FOREIGN PATENT DOCUMENTS

| JP | 06-016851 A | 1/1994 |
|---|---|---|
| JP | 2001-083327 A | 3/2001 |
| JP | 2001-183528 A | 7/2001 |
| JP | 2004-126546 A | 4/2004 |
| JP | 2005-121766 A | 5/2005 |
| JP | 2005241989 A * | 9/2005 |
| JP | 2005-297539 A | 10/2005 |
| JP | 2005-305944 A | 11/2005 |
| JP | 2006-117906 A | 5/2006 |
| JP | 2006-126808 A | 5/2006 |
| JP | 2006-169494 A | 6/2006 |
| JP | 2012-007122 A | 1/2012 |

OTHER PUBLICATIONS

English Translation of JP2005/241989, published Sep. 8, 2005.*
Kagaku Jiten (Dictionary of Chemistry), the first edition, Tokyo Kagaku Dojin, Oct. 1, 1994, pp. 1372-1373.

* cited by examiner

*Primary Examiner* — Mary Ellen Bowman
(74) *Attorney, Agent, or Firm* — Novac Druce Connolly Bove + Quigg LLP

(57) ABSTRACT

The present invention provides an optical layered body having a good antistatic performance and good optical properties as well as an excellent durability. The present invention provides an optical layered body, comprising: an antistatic layer on a light-transmitting substrate, wherein the antistatic layer is a resin thin film layer containing at least an organic conductive material and a nonconductive polymeric material which is a resin having a glass transition temperature of 60° C. or higher or a resin obtainable by a reaction between a resin having a glass transition temperature of 60° C. or higher and a cross-linking agent.

16 Claims, 1 Drawing Sheet

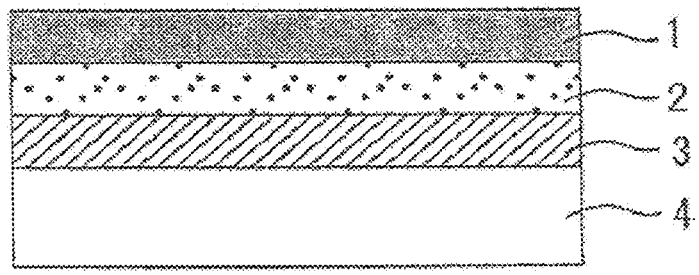

OPTICAL LAYERED BODY, POLARIZER AND IMAGE DISPLAY DEVICE

CROSS REFERENCE TO RELATED APPLICATIONS

This application is a national phase of PCT/JP2007/075135, filed on Dec. 27, 2007, which claims priority to JP 2006-355469, filed on Dec. 28, 2006, the entire contents of which are incorporated herein by reference in their entireties.

TECHNICAL FIELD

The present invention relates to an optical layered body, a polarizer, and an image display device.

BACKGROUND ART

An optical layered body, which has various properties such as an antireflection property, a hardness property, and transparency, is generally provided on the outermost surface of an image display device such as a cathode-ray tube (CRT) display device, a liquid crystal display (LCD), a plasma display (PDP), and an electroluminescence display (ELD). An optical layered body of this kind has an antistatic layer containing an antistatic agent that is a conductive material in order to have an antistatic function for preventing dust adhesion (Patent Document 1).

An inorganic material such as tin oxide and indium tin oxide particles, a metal oxide material, or a conductive polymer such as polythiophene are known as the antistatic agent. In particular, an organic conductive material such as a conductive polymer is preferably used in an optical layered body, since it is advantageously excellent in light transmission property compared with inorganic materials.

However, there has been a problem that the organic conductive material is poor in durability such as a light-resistance property and a heat-resistance property, compared with an inorganic material. Especially, an organic conductive material is poor in the light-resistance property, and therefore, the antistatic property cannot be maintained in a case where a display panel with the optical layered body is used in the open air. Accordingly, improvement of the light-resistance property has been wanted.

An ultraviolet absorbing agent and an antioxidant have been used in the antistatic layer in order to improve the light-resistance property. However, these additives are likely to be low molecular weight materials and may cause a harmful effect of inhibiting other functions by moving during or after the coat formation of antistatic layers. On the other hand, when the durability improvement by additives can not be expected, the chemical structure of the conductive polymer needs to be changed so as to have high-durable chemical structure, which causes significant cost.

Accordingly, there has been wanted development of an optical layered body which can be manufactured at low cost and has good conductivity and good optical properties as well as excellent durability.

Patent Document 1: JP-A 2006-126808

DISCLOSURE OF THE INVENTION

Problems to be Solved by the Invention

In view of the above-mentioned state of the art, it is an object of the present invention to provide an optical layered body having a good antistatic property and good optical characteristics as well as an excellent durability.

Means for Solving the Problems

The present invention provides an optical layered body, comprising: an antistatic layer on a light-transmitting substrate, wherein the antistatic layer is a resin thin film layer containing at least an organic conductive material and a non-conductive polymeric material which is a resin having a glass transition temperature of 60° C. or higher or a resin obtainable by a reaction between a resin having a glass transition temperature of 60° C. or higher and a cross-linking agent.

The resin having a glass transition temperature of 60° C. or higher is preferably a polyester resin.

The organic conductive material is preferably an electron-conductive polymer.

The organic conductive material is preferably polythiophene or polyaniline.

An amount of the organic conductive material is preferably 40 to 70 parts by weight with respect to 100 parts by weight of a total solid content of the antistatic layer.

A layer thickness of the antistatic layer is preferably 10 nm to 5 μm.

The antistatic layer is preferably formed with a composition for forming an antistatic layer containing an organic conductive material, a nonconductive polymeric material and an organic solvent.

The optical layered body preferably further comprises a hard coat layer.

The optical layered body preferably further comprises a low refractive index layer.

The optical layered body preferably has a visible light transmittance of 90% or higher.

The optical layered body preferably has a surface resistivity R1 before a light resistance test and a surface resistivity R2 after the light resistance test showing a ratio (R2/R1) of 100 or less, the light resistance test being performed under conditions of a black panel temperature of 63±3° C., a humidity of 40±10% RH, and a test time of 50 hors, and has a surface resistivity R3 before a heat resistance test and a surface resistivity R4 after the heat resistance test showing a ratio (R4/R3) of 100 or less, the heat resistance test being performed under conditions of a test temperature of 80° C. and a test time of 100 hours.

The present invention also provides a self-luminous image display device, comprising: the optical levered body on the outermost surface.

The present invention further provides a polarizer, comprising: a polarizing element, wherein the polarizer includes the optical layered body on a surface of the polarizing element.

The present invention furthermore provides a non-self-luminous image display device, comprising: the optical layered body or the polarizer, on the outermost surface.

Hereinafter, the present invention will be described in detail.

The present invention provides an optical layered body, comprising: an antistatic layer on a light-transmitting substrate, wherein the antistatic layer is a resin thin film layer containing at least an organic conductive material and a non-conductive polymeric material which is a resin having a glass transition temperature of 60° C. or higher or a resin obtainable by a reaction between a resin having a glass transition temperature of 60° C. or higher and a cross-linking agent.

Accordingly, the optical layered body is excellent in all of the antistatic property, the light transmission property, and the durability.

The antistatic layer is a layer having an electric conductivity, and an example thereof includes layer comprising a conductive antistatic agent. A layer of this kind can prevent an adhesion of dust on the surface of the optical layered body and a defect in the process due to a static charge. Compared to an inorganic conductive material, an organic conductive material is more preferably used as the antistatic agent because better light transmission property can be achieved. However, the use of an organic conductive material may cause a problem that durability (a light resistance property and a heat resistance property) is reduced (a problem that an antistatic property is lowered, namely a surface resistivity is significantly increased, after a light resistance test and a heat resistance test). Accordingly, it has been difficult to achieve good performance in all of the antistatic property, the light transmission property, and the durability.

The present invention can provide an optical layered body having excellent durability (a light resistance property and a heat resistance property) as well as a desired antistatic property and excellent light transmission property by containing a nonconductive polymeric material, which is a resin having the glass transition temperature of 60° C. or higher or a resin reactant obtainable by a reaction between the foregoing resin and a cross-linking agent, in addition to the organic conductive material, in the antistatic layer. With the optical layered body of the present invention, it is possible to achieve excellent performance in all of the antistatic property, the light transmission property, and the durability at low cost.

The combination use of an organic conductive material and the specific nonconductive polymeric material can provide an organic conductive material with excellent heat stability, which is attributable to the polymeric material having the high glass transition temperature, so that the heat resistance property can be improved. Further, use of polyester, for example, as a nonconductive polymeric material can also improve a light resistance property because of its effect as a light stabilizer. Polyester can provide the above-mentioned effect without reducing the light transmittance in a combination use because of the light transmission property of polyester itself and without reducing the antistatic property and the stability of the organic conductive material because of its nonconductive property. Accordingly, the optical layered body of the present invention can presumably achieve excellent performance in all of the conductivity, the light transmission property, and the durability.

It is to be noted that the improvement of the light resistance property in the present invention means that the surface resistivity R1 before a light resistance test and the surface resistivity R2 after the light resistance test show a ratio (R2/R1) of 100 or less, the light resistance test being performed under conditions of a black panel temperature of 63±3° C., a humidity of 40±10% RH, and a test time of 50 hours.

Further, it is to be noted that the improvement of the heat resistance property in the optical layered body means that the surface resistivity R3 before a heat resistance test and the surface resistivity R4 after the heat resistance test show a ratio (R4/R3) of 100 or less, the heat resistance test being performed under conditions of a test temperature of 80° C. and a test time of 100 hours.

The antistatic layer contains a nonconductive polymeric material which is the resin having a glass transition temperature of 60° C. or higher or a resin obtainable by a reaction between the resin having glass transition temperature of 60° C. or higher and a cross-linking agent. Combination use of the specific nonconductive polymeric material and an organic conductive material can provide an optical layered body having excellent performance in all of the antistatic property, the light transmission property, and the durability.

The nonconductive polymeric material is a resin not showing conductivity and having a glass transition temperature (Tg) of 60° C. or higher. When the glass transition temperature is less than 60° C., a defect in a heating process for forming an antistatic layer may be caused and heat stability of the to-be-formed antistatic layer may be reduced.

The glass transition temperature is preferably 65 to 200° C. It is to be noted that the glass transition temperature is obtainable by measurement using a differential scanning calorimeter (DSC).

The resin having the glass transition temperature of 60° C. or higher preferably has a hydroxyl value of 5 to 20 KOHmg/g. When the hydroxyl value is less than 5 KOHmg/g, adhesion of the antistatic layer to the substrate may be reduced. When they hydroxyl value is more than 20 KOHmg/g, a molecular weight of the resin may be reduced, so that a defect in a heating process for forming an antistatic layer is caused and heat stability of the to-be-formed antistatic layer is reduced. The hydroxyl value is more preferably 6 to 15 KOHmg/g.

The resin having a glass transition temperature of 60° C. or higher preferably has a number average molecular weight of 10000 to 30000. When the number average molecular weight is less than 10000, a defect in a heating process for forming an antistatic layer may be caused and heat stability of the to-be-formed antistatic layer may be reduced. When the number average molecular weight is more than 30000, solvent solubility of the resin may be reduced, so that the resin is less likely to be made into a coating composition or a film-forming property thereof may be reduced. The number average molecular weight is more preferably 15000 to 20000.

It is to be noted the number average molecular weight is calculated as a styrene equivalent molecular weight calculated using a value obtained by gel permeation chromatography (GPC).

The resin having a glass transition temperature of 60° C. or higher is not particularly limited, and examples thereof include thermosetting resins such as epoxy resin, polyimide resin, polyester resin, phenol resin, urea resin, diallyl phthalate resin, melamine resin, guanamine resin, unsaturated polyester resin, polyurethane resin, epoxy resin, aminoalkyd resin, meramine-urea cocondensation resin, silicon resin, and polysiloxane resin, each of which has a glass transition temperature within the above-mentioned range; and thermoplastic resins such as cellulose derivative, vinyl acetate resin, vinyl chloride resin, acrylic resin, polystyrene resin, polyimide resin, and poly carbonate resin; and the like. Two or more kinds of these may be used in combination.

In particular, the polyester resin is preferably used because it is excellent in transparency, mechanical strength, and optical properties as well as a compatibility with an organic conductive material. The polyester resin is preferably an aromatic polyester including some types of aromatic groups.

The polyester resin is obtainable by coconcentrating an acid component having a polycarboxylic acid as a main component with an alcohol component having a polyalcohol as a main component through a general method. The glass transition temperature can be set by adjusting a blending ratio of the monomers to be used, and accordingly, it can be set to 60° C. or higher by selecting and combining monomer components mentioned below.

The acid component is not particularly limited, and examples thereof include terephthalic acid, isophthalic acid, phthalic acid, trimellitic acid and anhydrides of these; aromatic dicarboxylic acids, such as 2,6-naphthalene dicarboxylic acid and 2,7-naphthalene dicarboxylic acid, and anhydrides of these; saturated aliphatic dicarboxylic acids, such as succinic acid, adipic acid, azelaic acid, sebacic acid, dodecanedicarboxylic acid, 1,4-cyclohexanedicarboxylic acid, and anhydrides of these. In addition, the examples further include lactones such as γ-butyrolactone and ε-caprolactone, and hydroxycarboxylic acids corresponding to these; and aromatic oxymonocarboxylic acids such as p-oxyethoxybenzoic acid. Two or more kinds of the above acid components may be used in combination. In particular, terephthalic acid is preferably used because stability of its compound is good.

The alcohol component is not particularly limited, and examples thereof include: diols, such as ethylene glycol, 1,3-propanediol, 1,4-butanediol, 1,5-pentanediol, 1,5-hexanediol, diethylene glycol, triethylene glycol, 1,4-cyclohexanediol, 1,4-cyclohexandimethanol, bisphenol A alkylene oxide adducts, bisphenol S alkylene oxide adducts, 1,2-propanediol, neopentylglycol, 1,2-butanediol, 1,3-butanediol, 1,2-pentanediol, 2,3-pentanediol, 1,4-pentanediol, 1,4-hexanediol, 2,5-hexanediol, 3-methyl-1,5-pentanediol, 1,2-dodecanediol, and 1,2-octadecanediol; trivalent or higher polyalcohol such as trimethylolpropane, glycerin, and pentaerythritol; and the like. Two or more kinds of the alcohol components may be used in combination.

Examples of commercial product of the nonconductive polymeric material having a glass transition temperature of 60° C. or higher include VYLON 200 (commercial name, polyester, Tg 67° C., manufactured by Toyobo. Co., Ltd) and EX-1010 (commercial name, epoxy resin, Tg 197° C., manufactured by Nagase ChemteX Corporation).

The nonconductive polymeric material is also a resin obtainable by a reaction between the resin having a glass transition temperature of 60° C. or higher and a cross-linking agent. The reaction between the resin having a glass transition temperature of 60° C. or higher and a cross-linking agent can provide an optical layered body having further improved heat resistance property.

The cross-linking agent is not particularly limited as long as it is used as a cross-linking agent for a resin, and a known agent may be used. Examples thereof include isocyanate cross-linking agents and epoxy cross-linking agents. Two at more kinds of these may be used in combination. In particular, an isocyanate cross-linking agent is preferably used because of its high reactivity.

Examples of the isocyanate cross-linking agent include aliphatic isocyanates such as trimethylene diisocyanate, tetramethylene diisocyanate, pentamethylene diisocyanate, hexamethylene-diisocyanate (HDI), and trimethyl-hexamethylene diisocyanate; aliphatic cyclic isocyanates such as 1,3-cyclopentane diisocyanate, 1,4-cyclohexane diisocyanate, and 1,2-cyclohexane diisocyanate; aromatic isocyanates such as xylylene diisocyanate (XDI), 2,4-tolylene diisocyanate (TDI), and 2,6-tolylene diisocyanate; alicyclic isocyanates such as isophorone diisocyanate (IPDI) and norbornane diisocyanate methyl; polymers, such as biuret forms and nurate forms, and mixtures of these; blocked isocyanates; and the like.

Examples of the epoxy cross-linking agent include ethylene glycol glycidyl ether, polyethylene glycol diglycidyl ether, glycerol diglycidyl ether, glycerol triglycidyl ether, 1,3-bis(N,N-diglycidylaminomethyl) cyclohexane, N,N,N',N'-tetraglycidyl-m-xylylenediamine, N,N,N',N'-tetraglycidyl aminophenyl methane, triglycidyl isocyanurate, m-N,N-diglycidyl aminophenyl glycidyl ether, N,N-diglycidyl toluidine, N,N-diglycidyl aniline, and the like.

An amount of the cross-linking agent is preferably 25 parts by weight or more, with respect to 100 parts by weight of a solid content of the resin having a glass transition temperature of 60° C. or higher, in the antistatic layer. When the amount is less than 25 parts by weight, cross-linking reaction may not sufficiently be caused. The amount is more preferably 50 parts by weight or more.

The antistatic layer contains an organic conductive material. Combination use of the nonconductive polymeric material and an organic conductive material can provide an optical layered body excellent in all of the antistatic property, the light transmission property, and the durability.

Examples of the organic conductive material include known electron-conductive polymers.

Examples of the electro-conductive polymers include aliphatic conjugated compounds such as polyacetylene, aromatic conjugated compounds such as poly(paraphenylene), heterocyclic conjugated compounds such as polypyrrole and polythiophene, heteroatom-containing conjugated compounds such as polyaniline, fused conjugated compounds such as poly(phenylenevinylene), a multi-chain conjugated compounds having a plurality of conjugated chains in a molecule, conductive complexes which are polymers prepared by graft-copolymerizing or block-copolymerizing the above conjugated polymer chains to a saturated polymer. Two or more kinds of these may be used in combination.

In particular, polyaniline, polythiophene, or a derivative of either of these is preferable, because each of these is capable of exerting excellent antistatic property, increasing the light transmittance of the optical layered body, and reducing the haze value. In particular, polythiophene is more preferable.

An amount of the organic conductive material is preferably 40 to 70 parts by weight with respect to 100 parts by weight of the total solid content of the antistatic layer. When the amount is less than 40 parts by weight, the sufficient antistatic property may not be achieved. When the amount is more than 70 parts by weight, durability-improving effect may be lowered, so that maintenance of the durability may be difficult. The amount is more preferably 50 to 60 parts by weight.

An example of a commercial product of the organic conductive material includes. TA2010 (commercial name, polythiophene derivative dispersion, manufactured by Idemitsu Technofine Co., Ltd.).

If required, the antistatic layer may be formed using other materials in addition to the above materials, but only to a level that will not have an influence on the effect of the present invention. Examples of other materials include resins other than the above mentioned resin, surfactants, coupling agents, thickeners, anti-coloring agents, coloring agents such as pigments or dyes, antifoaming agents, leveling agents, flame retardants, ultraviolet absorbents, infrared absorbents, tackifiers, polymerization inhibitors, antioxidants, surface modifiers, and the like. As the above material, known materials generally used in the antistatic layer may be used.

The antistatic layer can be formed using a composition for forming an antistatic layer obtainable by mixing the nonconductive polymeric material, the organic conductive material, and other materials with a solvent and carrying out the dispersing treatment thereof. It is preferred to use a paint shaker or a bead mill for mixing and dispersing the materials.

An organic solvent is preferable as the solvent, and examples thereof include alcohols (e.g. methanol, ethanol, isopropanol, butanol, and benzyl alcohol), ketones (e.g. acetone, methyl ethyl ketone, methyl isobutyl ketone, and cyclohexanone), esters (e.g. methyl acetate, ethyl acetate, propyl acetate, butyl acetate, methyl formate, ethyl formate, propyl formate, and butyl formate), aliphatic hydrocarbons (e.g. hexane and cyclohexane), halogenated hydrocarbons (e.g. methylene chloride, chloroform, and carbon tetrachloride), aromatic hydrocarbons (e.g. benzene, toluene, and xylene), amides (e.g. dimethylformamide, dimethylacetamide, and n-methylpyrrolidone), ethers (e.g. diethyl ether, dioxane, and tetrahydrofuran), and ether alcohols (e.g. 1-methoxy-2-propanol). Further, examples include toluene, xylene, methyl ethyl ketone, methyl isobutyl ketone, cyclohexanone, butanol, and the like. However, the organic solvent is not limited to these. In particular, alcohol-type solvents, ketone-type solvents, and ether alcohol-type solvents are preferably used because of their dispersibility, dispersion stabilization, and safety. Two or more kinds of these may be used in combination.

The antistatic layer is preferable formed by applying the composition for forming an antistatic layer, for example, on a light-transmitting substrate or on a hard coat layer and the composition is preferably cured by drying and/or heating to form the antistatic layer.

Examples of an coating method of the composition for forming an antistatic layer include a roll coating method, a Meyer's bar coat method, a gravure coat method, a die coating method, and the like.

A layer thickness of the antistatic layer is preferably 10 nm to 5 μm. When the layer thickness is less than 10 nm, the sufficient antistatic property may not be achieved. When the layer thickness is more than 5 μm, color reproducibility may be reduced in a case where an optical layered body comprising the antistatic layer is provided on a display surface. The layer thickness is more preferably 100 nm to 1 μl.

Light transmittance of the antistatic layer is preferably 70% or higher. When the light transmittance is less than 70%, color reproducibility may be reduced in a case where an optical layered body comprising the antistatic layer is provided on a display surface. The light transmittance is more preferably 80% or higher, and more preferably 90% or higher.

A haze of the antistatic layer is preferably 10% or lower. When the haze is higher than 10%, color reproducibility may be reduced in a case where an optical layered body comprising the antistatic layer is provided on a display surface. The haze is more preferably 5% or lower.

It is to be noted that the haze of the antistatic layer is the value obtainable by using a NDH 2000 haze meter manufactured by Nippon Denshoku Industries Co., Ltd.

The optical layered body comprising the antistatic layer preferably has a surface resistivity of $10^{12}$ Ω/square or lower. When the surface resistivity thereof is higher than $10^{12}$ Ω/square, the sufficient antistatic performance may not be achieved. The surface resistivity thereof is more preferably $10^{10}$ Ω/square or lower.

The optical layered body of the present invention, which comprises the antistatic layer, is excellent in durability (a light resistance property and a heat resistance property). Namely, in the optical layered body of the present invention, a surface resistivity R1 before a light resistance test and a surface resistivity R2 after the light resistance test preferably show a ratio (R2/R1) of 100 or less, the light resistance test being performed under conditions of a black panel temperature of 63±3° C., a humidity of 40±10% RH, and a test time of 50 hours, and a surface resistivity R3 before a heat resistance test and a surface resistivity R4 after the heat resistance test preferably show a ratio (R4/R3) of 100 or less, the heat resistance test being performed under conditions of a test temperature of 80° C. and a test time of 100 hours. The (R2/R1) is more preferably 10 or less and the (R4/R3) is more preferably 10 or less.

The optical layered body of the present invention comprises a light-transmitting substrate. It is preferable that the light-transmitting substrate has good smoothness, a good heat resistance property, and an excellent mechanical strength. Specific examples of a material forming the light-transmitting substrate include thermoplastic resins, such as acrylics (polymethylmethacrylate), polyesters (polyethylene terephthalate and polyethylene naphthalate), triacetyl cellulose, cellulose diacetate, cellulose acetate butylate, polyamides, polyimides, polyethersulfones, polysulfones, polypropylene, polymethylpentene, polyvinyl chloride, polyvinyl acetals, polyether ketones, polymethyl methacrylate, polycarbonates, and polyurethanes. In particular, polyesters (polyethylene terephthalate and polyethylenenaphthalate) and triacetyl cellulose are preferable.

As the light-transmitting substrate, an amorphous olefin polymer (Cyclo-Olefin-Polymer (COP)) film having an alicyclic structure may also be used. This is a substrate comprising a norbornene polymer, a monocyclic olefin polymer, a cyclic conjugated diene polymer, a vinyl alicyclic hydrocarbon polymer resin, or the like. Examples thereof include ZEONEX and ZEONOR (norbornene resin) manufactured by Nippon ZEON Corporation, SUMILITE FS-1700 manufactured by Sumitomo Bakelite Co., Ltd., ARTON (modified norbornene resin) manufactured by JSR corporation, APEL (cyclo olefin copolymer) manufactured by Mitsui Chemicals, Inc., Topas (cyclo Olefin copolymer) manufactured by Ticona, OPTOREZ OZ-1000 series (alicyclic acrylic resin) manufactured by Hitachi Chemicals Ltd., and the like. Further, FV series (low birefringent and low photoelastic coefficient film) manufactured by Asahi Kasei Chemicals Corporation are also preferable as a substrate substituting for the substrate of triacetyl cellulose.

As the light-transmitting substrate, the thermoplastic resin is preferably used in a flexible film form. In accordance with the case where curability is required, plates of these thermoplastic resins or a plate-like body of glass plate may be used.

The thickness of the light-transmitting substrate is preferably 20 μm or more, and 300 μm or less. The upper limit is more preferably 200 μm and the lower limit is more preferably 30 μm. When the light-transmitting substrate has a plate-like body, the thickness of the light-transmitting substrate may have a thickness thicker than the range (300 μm to 10 mm). In order to enhance the adhesion property, the substrate may be subjected to physical treatments such as corona discharge treatment and oxidation treatment, or may be coated by a coating composition such as an anchoring agent or primer before forming layer as the hard coat layer and the antistatic layer on the substrate.

The optical layered body of the present invention preferably further comprises a hard coat layer. The hard coat layer is preferably formed on the antistatic layer formed on the light-transmitting substrate.

The hard coat layer refers to a layer having a degree of hardness of "H" or more in a pencil hardness test according to JIS5600-5-4(199). The hard coat layer preferably has a film thickness (when cured) in a range of 0.1 to 100 μm, more preferably in a range of 0.8 to 20 μm. The hard coat layer can be formed with a composition for forming a hard coat layer containing a resin, a solvent, and an optional component.

The resin preferably has transparency, and specific examples thereof include four types of resins including: ionizing radiation-curable resins which are cured with ultraviolet or an electron beam; solvent-drying type resins (resins, such as thermoplastic resins that are made into a coat only by evaporating a solvent added to the resin for adjusting a solid content thereof at application of the resin); mixtures of the ionizing radiation-curable resins and solvent-drying type resins; and thermosetting resins. In particular, the ionizing radiation-curable resin is preferable.

Examples of the ionizing radiation-curable resins include resins having acrylate functional groups. The resins having acrylate functional groups include origomers or prepolymers with a comparatively low molecular weight, such as (meth)acrylate of polyester resins, polyether resins, acrylic resins, epoxy resins, urethane resins, alkyd resins, spiroacetal resins, polybutadiene resins, and polythiol-polyene resins, polyfunctional compounds such as a polyhydric alcohol; and reactive diluents. Specific examples of these include monofunctional monomers and polyfunctional monomers of ethyl(meth)acrilate ethylhexyl(meth)acrylate, stylene, methyl stylene, N-vinylpyrrolidone, and the like, such as polymethylolpropanetri(meth)acrylate, hexanediol(meth)acrylate, tripropylene glycol di(meth)acrylate, diethylene glycol di(meth)acrylate, pentaerythritol tri(meth)acrylate, dipentaerythritol hexa (meth)acrylate, 1,6-hexanedial di(meth)acrylate, and neopentylglycol di(meth)acrylate.

Examples of the solvent-drying type resin include thermoplastic resins. A generally-exemplified thermoplastic resin is used. Addition of the solvent-drying type resin can effectively prevent a film defect on the coated surface. According to a preferable embodiment of the present invention, when a material of the light-transmitting substrate is a cellulose resin such as TAC, preferable examples of the thermoplastic resin include cellulose resins such as nitrocellulose, acetyl cellulose, cellulose acetate propionate, and ethyl hydroxyethyl cellulose.

Specific examples of the thermoplastic resins include phenol resins, urea resins, diallyl phthalate resins, melamine resins, guanamine resins, unsaturated polyester resins, polyurethane resins, epoxy resins, aminoalkyd resins, meramine-urea cocondensated resins, silicone resins, polysiloxane resins, acrylic ester copolymer resins, and the like.

The solvent preferably has permeability to the light-transmitting substrate and the antistatic layer. In the present invention, "permeability" involves all the concepts such as permeability, swelling property, and wettability with respect to the light-transmitting substrate and the like.

Specific examples of the solvent include alcohols such as isopropyl alcohol, methanol, and ethanol; ketones such as methyl ethyl ketone, methyl isobutyl ketone, and cyclohexanone; esters such as methyl acetate, ethyl acetate and butyl acetate; halogenated hydrocarbon; aromatic hydrocarbon such as toluene and xylene; and mixtures of these.

Specific examples of the solvent further include acetone, methyl acetate, ethyl acetate, butyl acetate, chloroform, methylene chloride, trichloroethane, tetrahydrofuran, methyl ethyl ketone, methyl isobutyl ketone, cyclohexanone, nitromethane, 1,4-dioxan, dioxolane, N-methyl pyrrolidone, N,N-dimethylformamide, methanol, ethanol, isopropyl alcohol, butanol, isobutyl alcohol, diisopropyl ether, methyl cellosolve, ethyl cellosolve, and butyl cellosolve. In particular, methyl acetate, ethyl acetate, butyl acetate, and methyl ethyl ketone are preferable.

An amount of the solvent is preferably 50 to 100% by weight with respect to total weight of the solvent in the composition for forming a hard coat layer. In view of the processability, a solid content is preferably 10 to 70% by weight, and more preferably 40 to 50% by weight.

The composition for forming a hard coat layer may contain a photoinitiator. It is preferable to use a photoinitiator in a case where the ionizing radiation-durable resin is used as an ultraviolet curing resin. Specific examples of the photoinitiator include acetophenones, benzophenones, michler's benzoyl-benzoate, α-amyloxime esters, tetramethylthiuram monosulfide, thioxantones, and the like. Examples of a commercial product of the photoinitiator include IRGACURE 184 (commercial name, 1-hydroxy-cyclohexyl-phenyl-ketone, manufactured by Ciba Specialty Chemicals Inc.).

In addition, a photosensitizer is preferably mixed therewith, and specific examples thereof include n-butylamine, triethylamine, poly-n-butylphosphine, and the like.

The composition for forming hard coat layer is preferably added with a fluorine-based or silicone-based leveling agent. Addition of a leveling agent can effectively prevent an inhibition of cure of a coat surface caused by oxygen at the time of application or drying, and can provide the composition with abrasion resistance. Examples of the leveling agent include MCF-350-5 (commercial name, manufactured by Dainippon Ink and Chemicals Inc.) and the like.

According to need, the composition for forming a hard coat layer may contain an anti-glare agent, an antistatic agent, a cross-linking agent, a curing agent, a polymerization promoter, a solvent, a viscosity modifier, and the like, in addition to the resin, the solvent, and the other components. Known additives may be exemplified as the above additions.

The composition for forming a hard coat layer obtained by mixing the resin, the solvent, and other optional materials is applied on the light-transmitting substrate or on the formed antistatic layer, so that the hard coat layer is formed.

As the application method, the same method as that for forming the antistatic layer may be used.

After the application, the hard coat layer is preferably formed by drying, if required, and cure by irradiation with active energy beams.

The irradiation with active energy beams includes irradiation with ultraviolet rays or electron beams. Specific examples of an ultraviolet source include light source such as ultra-high pressure mercury lamps, high-pressure mercury lamps, low-pressure mercury lamps, carbon-arc lamps, black light florescent lamps, and metal-halide lamps. As wavelength of the Ultraviolet, a wave range of 190 to 380 nm is acceptable. Specific examples of a source of the electron beams include various kinds of electron beam accelerators such as Cockcroft-Walton type, van de Graaff type, resonance transformer type, insulator core transformer type, linear type, dynamitron type, and high frequency type.

The hard coat layer may have a projection and depression configuration on the surface thereof. The composition for forming a hard coat layer added with particles is used to form the hard coat layer or embossing is performed, so that the projection and depression configuration is formed.

The optical layered body of the present invention may further comprise a low refractive index layer.

The low refractive index layer has a refractive index of 1.46 or lower, and preferably has a refractive index of 1.38 or lower. The low refractive index layer is preferably a thin film having a thickness of around 30 nm to 1 μm. The low refractive index layer may be in a form of any one of the following materials: a resin containing silica or magnesium fluoride; a fluorine resin having a low refractive index; a fluorine resin containing silica or magnesium fluoride; or a thin film made of silica or magnesium fluoride. With respect to the resins other than the fluorine resins, the same resins used for constituting the hard coat layer may be used.

The low refractive index layer is more preferably constituted by a silicon-containing vinylidene fluoride copolymer. More specifically, the silicon-containing vinylidene fluoride copolymer is obtainable by copolymerizing a monomer composition which contains 30 to 90% by weight of vinylidene fluoride and 5 to 50% by weight of hexafluoropropylene with respect to 100% by weight of a solid content of the resin. The silicon-containing vinylidene fluoride copolymer is a resin composition comprising 100 parts by weight of a fluoride-containing copolymer having a fluorine content of 60 to 70%, and 80 to 150 parts by weight of a polymerizable compound having an ethylenically unsaturated group.

In the ratio of each component of the monomer composition, the vinylidene fluoride is preferably 30 to 90% by weight, more preferably 40 to 80% by weight, and further preferably 40 to 70% by weight, with respect to 100% by weight of the solid content of the resin.

The hexafluoropropylene is preferably 5 to 50% by weight, more preferably 10 to 50% by weight, and further preferably 15 to 45% by weight.

The monomer composition may further contain preferably 0 to 40% by weight, more preferably 0 to 35% by weight, and further preferably 10 to 30% by weight of tetrafluoroethylene.

The monomer composition may contain, for example 20% by weight or less, and, preferably 10% by weight or less of another copolymer component, only in a range that will not impair the intended purpose and the effect of the silicone-containing vinylidene fluoride copolymer. Specific examples thereof include polymerizable monomers having fluorine atoms such as fluoroethylene, trifluoroethylene, chlorotrifluoroethylene, 1,2-dichloro-1,2-difluoroethylene, 2-bromo-3,3,3-trifluoroethylene, 3-bromo-3,3-difluoropropylene, 3,3,3-trifluoropropylene, 1,1,2-trichloro-3,3,3-trifluoropropylene, and α-trifluoromethacrylic acid.

The fluoride-containing copolymer obtainable with the monomer composition described above is required to have a fluoride content of 60 to 70%, preferably 62 to 70%, and more preferably 64 to 68%. The fluorine content in this specific range provides the fluoride-containing polymer with good solubility to the solvent. In addition, by containing a fluoride-containing polymer of this kind as a component, the polymer forms a thin film having an excellent adhesive property to various substrates, having high transparency and a low refractive index as well as sufficiently excellent mechanical strength. Consequently, a surface having the thin film formed thereon is allowed to have sufficiently high mechanical properties such as abrasion resistance, and therefore, the copolymer is highly preferable to be used.

The fluoride-containing copolymer preferably has a molecular weight of 5000 to 200000 in a polystyrene equivalent number average molecular weight, and more preferably has a polystyrene equivalent number average molecular weight of 10000 to 100000. Use of the fluoride-containing copolymer having a polystyrene equivalent molecular weight in the range described above can provide the to-be-obtained fluorine resin composition with the suitable viscosity, and therefore, the fluorine resin composition has a suitable coating property. The fluoride-containing copolymer preferably has its refractive index of 1.45 or less, more preferably 1.42 or less, and further preferably 1.40 or less. When the fluoride-containing copolymer having a refractive index exceeding 1.45 is used, a thin film to be formed may have a lower antireflection effect.

In addition, the low refractive index layer may be constituted by a thin film comprising $SiO_2$, and may be formed by a deposition method, a sputtering method, or a plasma CVD method. Further, a $SiO_2$ gel film may be formed from sol containing $SiO_2$ sol so that the low refractive index layer is formed. The low refractive index layer can be formed with a $MgF_2$ thin film or another material other than $SiO_2$. However, it is preferable to use a $SiO_2$ thin film because it has an excellent adhesive property to a lower layer. When the plasma CVD method is used out of the above methods, it is preferably performed by using an organic siloxane as a source gas under a condition that another inorganic deposition source is not present. Further, it is preferably performed while a deposition target is maintained to have a low temperature.

Also, the low refractive index layer may be formed by a known method. For example, any of above-described various methods for forming the hard coat layer may be used. In addition, the obtained coat film may be cured by a known method, and the method may be selected as appropriate according to the components of the composition and the like.

The optical layered body of the present invention has a light-transmitting substrate and an antistatic layer. The optional layered body may also have an optional layer such as an antifouling layer, a high refractive index layer, or a middle refractive index layer, if needed, in addition to the hard coat layer or the low refractive index layer as above described. The antifouling layer, the high refractive index layer, and the middle refractive index layer may be prepared by adding materials such as antifouling agents, high refractive index agents, medium refractive index agents, antistatic agents, or resins, which are generally used, and the respective layers may be formed using a known method.

The optical layered body of the present invention preferably has visible light transmittance of 90% or higher. When the visible light transmittance is lower than 90%, color reproducibility may be reduced when it is provided on the display surface. The visible light transmittance is more preferably 95% or higher and further preferably 98% or higher.

The optical layered body preferably has an external haze of 20% or lower. When the external haze is higher than 20%, color reproducibility may be reduced when it is provided on the display surface. The external haze is more preferably 10% or lower and further preferably 5% or lower. The external haze refers to a haze depending upon a shape of the outermost surface of the layered body excluding an internal haze of the layered body. First, a haze of the whole optical layered body, namely a total haze, is measured. Next, a general-purpose hard coat resin layer is formed on the outermost surface of the layered body, the hard coat resin layer having a thickness enough to hide the shape on the outermost surface. Then, the haze of the optical layered body after the formation is measured and this haze is defined as an internal haze. The external haze is obtained by subtracting the internal haze from the total haze.

An embodiment of the optical layered body of the present invention is described with reference to drawings. FIG. 1 shows an optical layered body comprising a low refractive index layer 1, a hard coat layer 2, an antistatic layer 3, and a light-transmitting substrate 4, starting from the top. Examples of other embodiments of the optical layered body of the present invention include an optical layered body comprising a hard coat layer, an antistatic layer, and a light-transmitting substrate in the given order; or an antifouling layer, a hard coat layer, an antistatic layer, and a light-transmitting substrate it the given order. As mentioned above, the optical layered body of the present invention may comprise an optional layer according to the intended purpose excepting the antistatic layer, and is not limited to the above-described embodiments.

The optical layered body of the present invention is provided on a polarizing element with a surface thereof contacting the side opposite to the side where the antistatic layer in the optical layered body is present, so that a polarizer is obtained. Such a polarizer also constitutes the present invention.

The polarizing element is not particularly limited, and examples thereof include polyvinyl alcohol films, polyvinyl formal films, polyvinyl acetal films, and ethylene-Vinyl acetate copolymer saponified films, which are dyed with iodine or the like and stretched. In the laminating treatment of the polarizing element and the optical layered body of the present invention, a saponification treatment is preferably performed on the light-transmitting substrate (preferably triacetyl cellulose). The fine adhesive property between the polarizing element and the optical layered body and an antistatic effect can be achieved by the saponification treatment.

The present invention also provides an image display device comprising the optical layered body or the polarizer on the outermost surface. The image display device may be a non-self-luminous image display device such as LCD, or may be a self-luminous image display device such as PDP, FED, ELD (organic EL, inorganic EL) and CRT.

The LCD, which is a typical example of the non-self-luminous image display device, comprises a light-transmitting display and a light source device to irradiate the light-transmitting display from the backside. When the image display device of the present invention provides an LCD, the image display device comprises the optical layered body of the present invention or the polarizer of the present invention on the surface of this light-transmitting display.

When the present invention provides a liquid crystal display device having the optical layered body, a light source of the light source device irradiates from the bottom side of the optical layered body. In addition, in a SNT type liquid crystal display device, a retardation plate may be inserted between a liquid crystal display element and the polarizer. An adhesive layer may be provided between the respective layers of this liquid crystal display device if needed.

The PDP, which is the self-luminous image display device, comprises a surface glass substrate (electrodes are formed on the surface) and a backside glass substrate (electrodes and fine grooves are formed on the surface and the groove has red, green, and blue phosphor layers therein) that is located at a position opposite to the surface glass substrate with an electric discharge gas filled between these substrates. When the image display device of the present invention is a PDP, the PDP has the optical layered body described above on the surface of the surface glass substrate or on a front plate (glass substrate or film, substrate) thereof.

The self-luminous image display device may be an ELD apparatus in which luminous substances of zinc sulfide or diamines capable of emitting light with the application of a voltage are deposited on a glass substrate and display is performed by controlling a voltage to be applied to the substrate. The self-luminous image display device may also be an image display device such as CRT, which converts electric signals to light to generate visible images. In this case, the image display device is provided with the optical layered body described above on the outermost surface of each of the display devices or on the surface of a front plate thereof.

In any case, the optical layered body of the present invention can be used for displays of televisions, computers, word processors, and the like. Particularly, it can be suitably used for the surfaces of high-resolution image displays, such as CRTs, liquid crystal panels, PDPs, ELDs and FEDs.

Effects of the Invention

Since the optical layered body of the present invention has a configuration described above, it is excellent in antistatic performance, optical properties and durability. Therefore, the optical layered body of the present invention can be suitably applied to cathode ray tube (CRT) display devices, liquid crystal displays (LCD), plasma displays (PDP), and electroluminescence displays (ELD).

BRIEF DESCRIPTIONS OF THE DRAWING

FIG. 1 an example of a Schematic view of an optical layered body of the present invention.

EXPLANATION OF SYMBOLS 1 low refractive index layer
2 hard coat layer
3 antistatic layer
4 light-transmitting substrate

BEST MODE FOR CARRYING OUT THE INVENTION

Hereinafter, the present invention will be described in more detail based on examples.

The present invention will be described by way of the below examples, but the present invention is not to be construed to limit to these embodiments. Words of "part(s)" and "%" refer to "part(s) by weight" and "% by weight", unless otherwise specified.

Example 1

Preparation Coating Composition for Forming an Antistatic Layer

The following materials were mixed and ultrasonic dissolution was carried out thereon for 10 minutes, so that a uniform coating composition for forming an antistatic layer was prepared.

Preparation of Coating Composition 1 for Forming an Antistatic Layer

Polyester resin (NYLON 200, manufactured by TOYOBO CO., LTD., Tg=67° C.): 3 parts by weight
Polyaniline (electron conduction type electroconductive polymeric material, manufactured by Sigma-Aldrich Corporation): 7 parts by weight
Propylene glycol monomethyl ether (solvent): 5.5 parts by weight Preparation of Composition for Forming a Hard Coat Layer A composition for forming a hard coat layer having the following composition was prepared by blending the materials.

Pentaerythritol triacrylate (PET30, manufactured by Nippon Kayaku Co., Ltd.): 100 parts by weight
Methyl ethyl ketone: 43 parts by weight
Leveling agent (MCF-350-5, manufactured by Dainippon Ink and Chemicals Inc.): 2 parts by weight
Polymerization initiator (IRGACURE 184, manufactured by Ciba Specialty Chemicals Inc.): 6 parts by weight Production of Antistatic Optical Layered Body A transparent substrate (triacetylcellulose resin film (TF80UL, manufactured by Fuji Photo Film Co., Ltd.), thickness: 80 μm) was prepared and the coating composition 1 for forming an antistatic layer was applied on one side of the film using a Meyer rod. After the application, the film was placed in an oven heated to the temperature of 80° C. and kept for one minute so that the solvent in the coating was evaporated. As a result, a transparent antistatic layer was formed (0.5 g/cm$^2$ on a dry basis). After the antistatic layer was formed, the composition for forming a hard coat layer was applied thereon and placed in the oven heated to the temperature of 70° C. and kept for 30 seconds so that the solvent in the coating was evaporated. Then, the coating was irradiated with ultraviolet until an integrated amount of light reached 46 mJ, so that a transparent layer was formed (15 g/cm² on a dry basis) and an optical layered body was prepared.

Example 2

An antistatic Optical layered body of Example 2 was obtained, which has a layered structure of a substrate film, an antistatic layer, and a hard coat layer in the given order, in the same manner as in Example 1 except that 0.8 parts by weight of a cross-linking agent ("CORONATE L" manufactured by Nippon Polyurethane Industry Co., Ltd., an isocyanate-type cross-linking agent) was further added to the coating composition 1 for forming an antistatic layer.

Example 3

An antistatic optical layered body of Example 3 was obtained in the same manner as in Example 1 except that a coating composition 2 for forming an antistatic layer described below was used instead of the coating composition 1 for forming an antistatic layer.
Preparation of Coating Composition 2 for Forming an Antistatic Layer Polyester resin (VYLON 200, manufactured by TOYOBO CO., LTD., Tg=67° C.): 5 parts by weight Polythiophene (TA2010, manufactured by Idemitsu Technifine Co., Ltd.; in a solid content): 5 parts by weight Isopropyl alcohol (solvent): 4.5 parts by weight Propylene glycol monomethyl ether (solvent): 0.5 parts by weight Comparative Example 1

A coating composition for forming an antistatic layer was prepared using the same materials as those of the coating composition 1 for forming an antistatic layer except for not using the polyester resin. Using this coating composition, an optical layered body was formed in the same manner as in Example 1. Accordingly, an antistatic optical layered body of Comparative Example 1 was obtained, which had a layered structure of a substrate film, an antistatic layer, and a hard coat layer in the given order.

Comparative Example 2

A coating composition for forming an antistatic layer was prepared using the same materials as those of the coating composition 1 for forming an antistatic layer except for using a polytrimethylene carbonate resin (Tg=around 10° C.) manufactured by Kanto Chemical Co., Inc. instead of the polyester resin. Using this coating composition, an optical layered body was formed in the same manner as in Example 1. Accordingly, an antistatic-optical layered body of Comparative Example 2, which had a layered structure of a substrate film, an antistatic layer, and a hard coat layer in the given order, was obtained.

Comparative Example 3

A coating composition for forming an antistatic layer was prepared using the same materials as those of the coating composition 1 for forming an antistatic layer except for using a low-Tg polyester resin (VYLON 220, Tg=53° C.) manufactured by TOYOBO CO., LTD. instead of the polyester resin. Using this coating composition, an optical layered body was formed in the same manner as in Example 1. Accordingly, an antistatic optical layered body of Comparative Example 3 was obtained, which had a layered structure of a substrate film, an antistatic layer, and a hard coat layer in the given order.

Comparative Example 4

A coating composition for forming an antistatic layer was prepared using the same material as those of the coating composition 2 for forming an antistatic layer except for not using the polyester resin. Using this coating composition, an optical layered body was formed in the same manner as in Example 3. Accordingly, an antistatic optical layered body of Comparative Example 4 was obtained, which had a layered structure of a substrate film, an antistatic layer, and a hard coat layer in the given order.

The surface resistivities before and after the light resistance test and the heat resistance test were measured with respect to each layered body obtained above. The light resistance test was carried out by using a carbon-arc-type fade meter ("ultraviolet autofade meter U48AU-B" manufactured by Suga Test Instruments Co., Ltd.), under conditions of a black panel temperature of 63±3° C., a humidity of 40±10% RH, and a test time of 50 consecutive hours without rainfall. The heat resistance test was carried out by placing the layered body in an oven heated to the temperature of 80° C. and kept for 100 hours. Table 1 shows measurement results.

TABLE 1

| | | Before the test | After the light resistance test | After the heat resistance test |
|---|---|---|---|---|
| Example 1 | polyaniline + polyester | $10^{11}$ | $10^{12}$ | $10^{12}$ |
| Example 2 | polyaniline + polyester + cross-linking agent | $10^{11}$ | $10^{12}$ | $10^{11}$ |
| Example 3 | polythiophene + polyester | $10^{10}$ | $10^{11}$ | $10^{10}$ |
| Comparative Example 1 | polyaniline | $10^{11}$ | $10^{14}$ | $10^{13}$ |
| Comparative Example 2 | polyaniline + poly(trimethylene-carbonate) | $10^{10}$ | $10^{14}$ | $10^{14}$ |
| Comparative Example 3 | polyaniline + low-Tg polyester | $10^{10}$ | $10^{14}$ | $10^{14}$ |
| Comparative Example 4 | polythiophene | $10^{10}$ | $10^{14}$ | $10^{14}$ |

*measure in Ω/sq.

As shown in Table 1, the optical layered bodies of Comparative Examples fail to acquire desired surface resistivities of $10^{12}$ Ω/square. On the other hand, the optical layered bodies of Examples have good surface resistivities before and after the heat resistance test and the light resistance test. The surface resistivities before and after the test show a ratio (surface resistivity after the test/surface resistivity before the test) of 100 or less, which means a coexistence of respective performances.

All the optical layered bodies of Examples and Comparative Examples have light transmittance of 92 to 94% and the external haze of 0.1 to 0.3%. Values of these optical properties are fine and almost unchanged before and after the light resistance test and the heat resistance test.

INDUSTRIAL APPLICABILITY

The optical layered body of the present invention can be suitably applied to a cathode-ray tube (CRT) display device, a liquid crystal display (LCD), a plasma display (PDP), an electroluminescence display (ELD), and the like.

The invention claimed is:

1. An optical layered body, comprising:
   an antistatic layer on a light-transmitting substrate and a hard coat layer on the antistatic layer,
   wherein the antistatic layer is a resin thin film layer containing at least an organic conductive material and a nonconductive polymeric material which is a resin having a glass transition temperature of 60° C. or higher or a resin obtainable by a reaction between a resin having a glass transition temperature of 60° C. or higher and a cross-linking agent, and
   the antistatic layer is formed with a composition for forming an antistatic layer containing the organic conductive material, the nonconductive polymeric material and an organic solvent, and the composition for forming an antistatic layer is obtained by mixing the organic conductive material and the nonconductive polymeric material with the organic solvent and carrying out a dispersing treatment thereof, and
   the hard coat layer is formed with a composition for forming a hard coat layer containing at least a resin and solvent having permeability to the light-transmitting substrate and the antistatic layer.

2. The optical layered body according to claim 1,
   wherein the resin having a glass transition temperature of 60° C. or higher is a polyester resin.

3. The optical layered body according to claim 1,
   wherein the organic conductive material is an electron-conductive polymer.

4. The optical layered body according to claim 3,
   wherein the organic conductive material is polythiophene, polyaniline, or a derivative thereof.

5. The optical layered body according to claim 1,
   wherein an amount of the organic conductive material is 40 to 70 parts by weight with respect to 100 parts by weight of a total solid content of the antistatic layer.

6. The optical layered body according to claim 1,
   wherein a layer thickness of the antistatic layer is 10 nm to 5 μm.

7. The optical layered body according to claim 1, further comprising a low refractive index layer.

8. The optical layered body according to claim 1,
   wherein a visible light transmittance is 90% or higher.

9. The optical layered body according to claim 1,
   wherein a surface resistivity R1 before a light resistance test and a surface resistivity R2 after the light resistance test show a ratio (R2/R1) of 100 or less, the light resistance test being performed under conditions of a black panel temperature of 63±3° C., a humidity of 40±10% RH, and a test time of 50 hours, and
   a surface resistivity R3 before a heat resistance test and a surface resistivity R4 after the heat resistance test show a ratio (R4/R3) of 100 or less, the heat resistance test being performed under conditions of a test temperature of 80° C. and a test time of 100 hours.

10. A self-luminous image display device, comprising:
    the optical layered body according to claim 1, on the outermost surface.

11. A polarizer, comprising:
    a polarizing element,
    wherein the polarizer includes the optical layered body according to claim 1, on a surface of the polarizing element.

12. A non-self-luminous image display device, comprising:
    the optical layered body according to claim 1, on the outermost surface.

13. The optical layered body according to claim 2,
    wherein the organic conductive material is an electron-conductive polymer.

14. The optical layered body according to claim 2,
    wherein an amount of the organic conductive material is 40 to 70 parts by weight with respect to 100 parts by weight of a total solid content of the antistatic layer.

15. The optical layered body according to claim 3,
    wherein an amount of the organic conductive material is 40 to 70 parts by weight with respect to 100 parts by weight of a total solid content of the antistatic layer.

16. The optical layered body according to claim 4,
    wherein an amount of the organic conductive material is 40 to 70 parts by weight with respect to 100 parts by weight of a total solid content of the antistatic layer.

* * * * *